Patented Apr. 12, 1927.

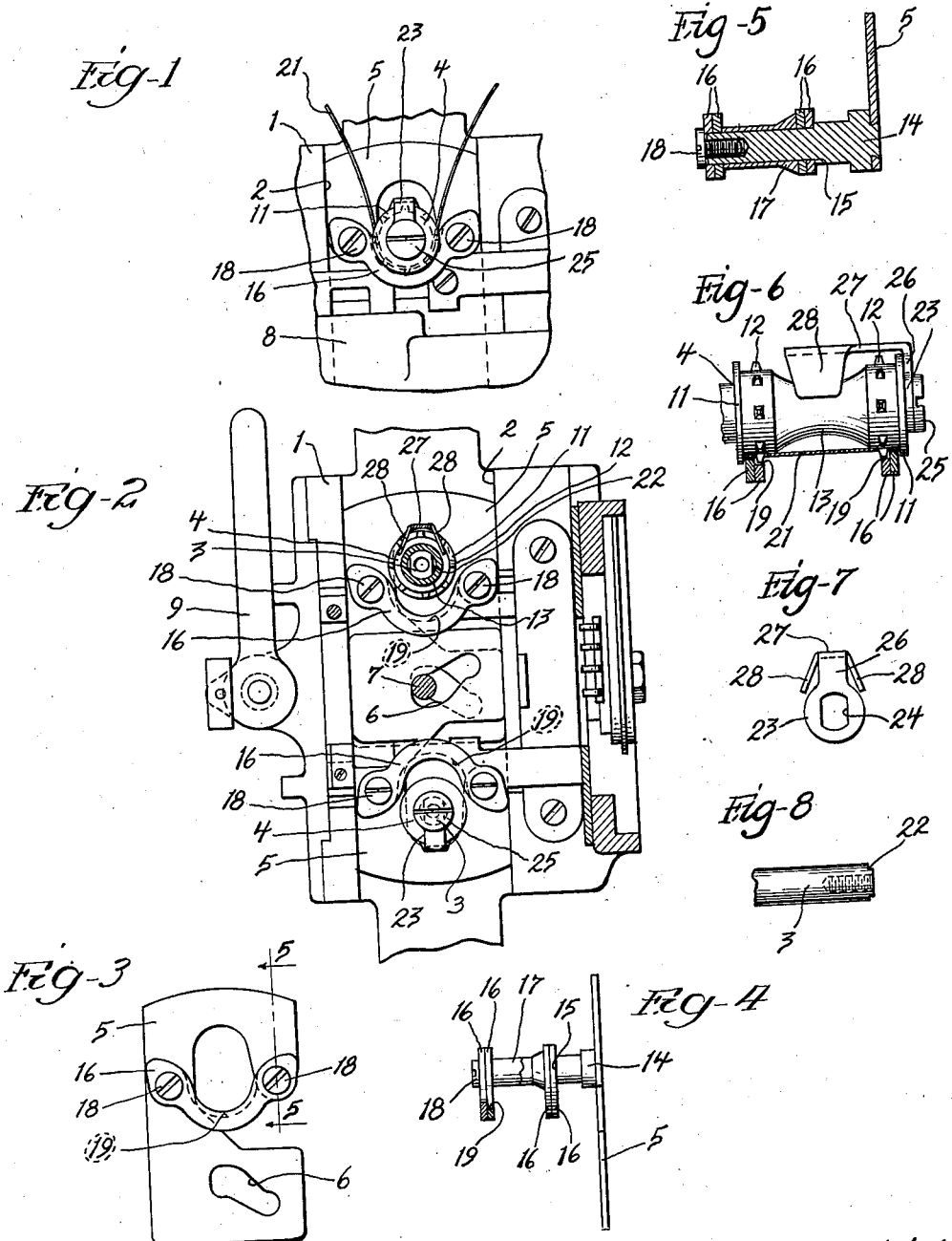

1,624,731

UNITED STATES PATENT OFFICE.

ALBERT S. HOWELL, OF CHICAGO, ILLINOIS, ASSIGNOR TO THE BELL & HOWELL COMPANY, OF CHICAGO, ILLINOIS, A CORPORATION OF ILLINOIS.

FILM SPROCKET GUIDE.

Application filed July 17, 1924. Serial No. 726,538.

My invention relates particularly to motion picture machines although not limited to this use alone.

Certain features of the invention relate to the provision of simple and effective sprocket guide means for retaining film in engagement with a sprocket, the guide affording a continuous guide for the film on the sprocket and being adapted for economical manufacture and assembly and embodying in its preferred form a plurality of similar flat parts adapted to be formed by punching from flat stock.

Other features of the invention relate to a stripper guide for preventing a film from wrapping around a sprocket in combination with a sprocket and sprocket mounting, whereby a simple and effective stripper construction is afforded, the stripper preferably acting as an end thrust for the sprocket and adapted to be formed by punching from flat stock.

With these features in view my invention consists in certain features of novelty in the construction, combination, and arrangement of parts by which the said features and certain other features, hereinafter appearing, are effected, all as fully described with reference to the accompanying drawing and more particularly pointed out in the claims.

In the said drawing—

Figure 1 is a partial side elevation of a motion picture machine embodying my invention.

Figure 2 is a more extended view of the same in similar elevation with parts removed and broken away.

Figure 3 is a similar elevation of one of the support plates with a film guide mounted thereon.

Figure 4 is a rear elevation of the same.

Figure 5 is an enlarged section on the line 5—5 of Fig. 3.

Figure 6 is an enlarged side elevation of one of the film sprockets and related parts with certain parts in section.

Figure 7 is an enlarged front elevation of the stripper guide.

Figure 8 is an enlarged partial side elevation of a sprocket shaft.

Like characters of reference indicate like parts in the several views.

Referring to the drawings 1 designates a gear casing of a motion picture machine, and formed on the outer surface of a side wall of this casing is a vertically extending relatively wide groove 2. Disposed in central relation with the groove are a pair of parallel vertically spaced stationary shafts 3 which are secured in the gear casing in a suitable manner and project outwardly from the said side wall of the casing in normal relation with the plane thereof. Film sprockets 4 are revolubly mounted on respective shafts 3 adjacent the outer ends thereof, they being driven by suitable mechanism within the gear casing. See Figs. 1 and 2.

Mounted for independent sliding movement in the groove 2 normal to the axes of the sprockets and disposed normal to said axes is a pair of support plates 5 overlapped between the sprockets. The overlapped portions of the plates 5 are provided with overlying opposite cam slots 6 which are engaged by a stud 7 mounted on a lens mount member 8, see Fig. 1, which lens mount member is disposed between the sprockets mounted for horizontal movement parallel with the plane of the plates 5. Manual movement of the lens mount member 8 is controlled by a lever 9 pivotally mounted on the front end of the casing 1 in a manner unnecessary to be described.

The sprockets 4, as shown, are flanged at both ends, as designated at 11, and are provided as usual with teeth 12 adjacent both ends of the film engaging portions thereof for engagement with marginal perforations of a film in a usual manner, the teeth being disposed in adjacent spaced relation with respective flanges. The sprockets are provided with externally reduced portions 13 between the toothed marginal film engaging portions thereof in order that the intermediate picture portion of the film will not be engaged by the sprockets.

Inasmuch as the film guide and stripper guide structures associated with respective sprockets, shown in Fig. 2, are identical in construction, arrangement, and function the same will be described as relates to one of the sprockets for purposes of brevity and clarity.

Secured on a plate 5 is a pair of parallel studs 14 spaced transversely of the plate and disposed on opposite sides of the respective sprocket in parallelism with the axis thereof. These studs project outwardly from the plate 5 and have their outer ends reduced and forming outwardly facing shoulders 15 substantially alined with the inner end of the film engaging portion of the sprocket. Four segmental pieces 16 are carried by the pair of studs 14 by means of the aforementioned reduced outer portions of the studs passing through registered apertures at respective ends of the segmental pieces. These segmental pieces are disposed correspondingly with their concave surfaces facing the sprocket and forming concave guide edge surfaces, and are arranged in spaced pairs of superposed pieces disposed in alinement with respective toothed film engaging portions of the sprocket. The outer segmental piece of the inner pair is engaged against the shoulders 15 of the studs 14, and the pairs of segmental pieces are spaced by bushings 17 on the studs between said pairs of segmental pieces, and the segmental pieces and bushings are clamped between the shoulders 15 of the studs and the heads of headed screws 18 screwthreaded into the outer ends of the studs 14. As so secured the outer segmental pieces of said pairs thereof are alined with respective of the portions of the marginal film engaging portions of the sprocket disposed between the flanges 11 and the teeth 12, and the inner segmental pieces of said pairs are alined with respective teeth 12 of the sprocket. Accordingly the concave guide edge surfaces of the inner segmental pieces are stepped below the concave guide edge surfaces of the outer segmental pieces, as designated at 19, in order to just clear the teeth 12 when the guide is in film retaining position with respect to the sprocket as shown in Figs. 1 and 6. When in film retaining position the outer segmental pieces of the guide lie between adjacent flanges 11 and teeth 12 of the sprocket for engagement with the portions of a film 21 between the perforations and longitudinal edges thereof.

The guide is shown in film retaining position with respect to the sprocket in Figs. 1 and 6, and in Fig. 2 the guides are shown out of film retaining position in which position the film may be engaged on or removed from the sprockets with lateral movement of the film, it passing through the space between the guides and sprockets as shown. The position of the guides with respect to the sprockets is controlled by movement of the stud 7 in the cam slots of the plates 5 which carry the guides.

Certain features of the general construction herein shown and described are described and claimed in my co-pending application for improvement in motion picture apparatus, Serial No. 708,707, filed April 24, 1924.

The stripper guide constructions of both sprockets are identical and will be described as though but one sprocket were shown. The portion of the shaft 3 at the outer end thereof is flattened on opposite sides thereof, as designated at 22, forming an outwardly facing shoulder. See Figs. 2 and 8. A stripper guide member 23, preferably formed of flat stock, is provided with an aperture 24, see Fig. 7, at one end corresponding with the flattened end portion of the shaft 3, and the stripper guide member is secured on the outer end of the shaft by the engagement of this aperture thereof with the flattened end portion 22 of the shaft and a headed screw 25 screwthreaded into the end of the shaft and clamping the stripper guide member between its head and the aforementioned shoulder of the shaft. The stripper guide member so secured to the shaft forms an outer thrust bearing for the sprocket, and it extends from the shaft radially beyond the sprocket, as designated at 26, and is then bent and extends longitudinally of the sprocket at the side thereof opposite that on which the aforementioned film guide lies, as designated at 27. The portion 27 of the stripper guide member is provided at the intermediate reduced portion 13 of the sprocket with extensions 28 at opposite side edges thereof which are bent toward the sprocket and extend and terminate inside of the curvilinear plane of the film engaging portions of the sprockets. Thus any tendency of the film to wrap around the sprocket is prevented by the engagement of an extension 28 with the film and stripping the same from the sprocket.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

Claims.

1. In a device of the character described the combination with a film sprocket provided with teeth adjacent respective ends thereof, of a segmental guide associated therewith, for retaining a perforated film engaged with the sprocket and provided with concave guide surfaces facing the sprocket and extending angularly with respect thereto and disposed in spaced relation adjacent respective ends of the sprocket for engagement with marginal portions of the film on the sprocket, said guide surfaces consisting of outer portions disposed on the outsides of respective teeth and inner portions stepped from the outer portions in a direction away from the axis of the sprocket and overlying respective teeth of the sprocket.

2. In a device of the character described the combination with a film sprocket flanged at both ends and provided with teeth on the inside of and disposed in adjacent spaced relation with respective flanges, of a segmental guide associated therewith for retaining a perforated film engaged with the sprocket between said flanges and provided with concave guide surfaces facing the sprocket and extending angularly with respect thereto and disposed in spaced relation adjacent respective ends of the sprocket for engagement with marginal portions of the film on the sprocket, said guide surfaces consisting of outer portions disposed between a respective flange of the sprocket and the teeth adjacent thereto and inner portions stepped from the outer portions in a direction away from the axis of the sprocket and overlying respective teeth of the sprocket.

3. In a film sprocket guide the combination of four flat segmental pieces disposed correspondingly in parallel planes to form a concave guide, said pieces being arranged in spaced pairs of superposed pieces and the concave surfaces of the inner pieces of said pairs being stepped below the concave surfaces of the outer pieces of said pairs to clear the teeth of an associated film sprocket, and means at the ends of said pieces whereby said pieces are secured in the aforementioned relation including studs disposed normal to the planes of said pieces.

4. In a film sprocket guide the combination of four flat segmental pieces disposed correspondingly in parallel planes to form a concave guide, said pieces being arranged in spaced pairs of superposed pieces and the concave surfaces of the inner pieces of said pairs being stepped below the concave surfaces of the outer pieces of said pairs to clear the teeth of an associated film sprocket, shouldered studs passing through registered apertures at respective ends of said pieces with the shoulders thereof engaged with one of the outer pieces, bushings on respective studs between the pairs of said pieces and spacing the same, and headed screws screwthreaded into the ends of respective studs adjacent the outer of said pieces opposite that engaged by the shoulders of the studs and clamping said pieces and bushings between their heads and the shoulders of the studs.

5. In a device of the character described the combination with a stationary shaft and a bored film sprocket revolubly mounted thereon adjacent one end thereof, of a stripper member secured to said end of the shaft and extending radially from the shaft beyond the sprocket and then longitudinally of the shaft over the sprocket at a side thereof for stripping film from the sprocket.

6. In a device of the character described the combination with a stationary shaft and a bored film sprocket revolubly mounted thereon adjacent one end thereof and provided with marginal film engaging portions spaced longitudinally thereof and an externally reduced portion therebetween, of a stripper member secured to said end of the shaft and extending radially from the shaft beyond the sprocket and then longitudinally of the shaft over the sprocket at a side thereof and provided at said reduced portion of the sprocket with extensions extending and terminating inside of the curvilinear plane of the film engaging portions of the sprocket on opposite sides of said reduced portion for stripping the film from the sprocket.

7. In a device of the character described the combination with a stationary shaft having a portion at one end thereof flattened on opposite sides thereof and forming an outwardly facing shoulder at the inner end of the flattened portion and a film sprocket revolubly mounted on the shaft adjacent said end thereof and provided with toothed marginal film engaging portions spaced longitudinally thereof and an externally reduced portion therebetween, of a stripper member formed of flat stock provided with an aperture corresponding with said flattened end of the shaft and engaged thereon and extending therefrom radially beyond the sprocket and then bent and extending longitudinally of the sprocket at a side thereof and provided at said reduced portion of the sprocket with extensions at opposite side edges thereof bent toward the sprocket and extending and terminating inside of the curvilinear plane of the film engaging portions of the sprocket on opposite sides of said reduced portion for stripping the film from the sprocket, and a headed screw screwthreaded into said end of the shaft and clamping said stripper member against said shoulder.

In witness whereof I hereunto affix my signature this 15th day of July, 1924.

ALBERT S. HOWELL.